United States Patent [19]

Tsuchiya et al.

[11] Patent Number: 5,200,461
[45] Date of Patent: Apr. 6, 1993

[54] ANIONIC MICROGEL PARTICLE DISPERSION AND A COATING COMPOSITION THEREFROM

[75] Inventors: Yasuyuki Tsuchiya, Hirakata; Kenshiro Tobinaga, Kawanishi, both of Japan

[73] Assignee: Nippon Paint Co., Ltd., Osaka, Japan

[21] Appl. No.: 548,187

[22] Filed: Jul. 5, 1990

Related U.S. Application Data

[63] Continuation of Ser. No. 171,916, Jan. 5, 1988, abandoned.

[30] Foreign Application Priority Data

| Jan. 7, 1987 | [JP] | Japan | 62-1332 |
| Jan. 7, 1987 | [JP] | Japan | 62-1333 |
| Jan. 7, 1987 | [JP] | Japan | 62-1334 |
| Jan. 7, 1987 | [JP] | Japan | 62-1336 |
| Jan. 7, 1987 | [JP] | Japan | 62-1337 |
| Jan. 7, 1987 | [JP] | Japan | 62-1338 |
| Jan. 7, 1987 | [JP] | Japan | 62-1339 |

[51] Int. Cl.$^5$ .............................................. C08K 3/20
[52] U.S. Cl. ........................... 524/510; 524/512; 524/819; 524/901; 525/68; 525/103
[58] Field of Search ............... 524/510, 512, 819, 901; 525/68, 103

[56] References Cited

U.S. PATENT DOCUMENTS

| 4,159,364 | 6/1979 | Craig | 524/510 |
| 4,378,450 | 3/1983 | Ema et al. | 525/143 |
| 4,560,714 | 12/1985 | Gajria et al. | 524/512 |
| 4,968,399 | 11/1990 | Tsuchiya et al. | 204/181.9 |

FOREIGN PATENT DOCUMENTS

| 0159883 | 10/1985 | European Pat. Off. . |
| 1929593 | 7/1968 | Fed. Rep. of Germany ...... 524/901 |
| 58-197296 | 11/1983 | Japan . |

OTHER PUBLICATIONS

Chemical Abstracts, vol. 100, 1984, p. 95, abstract no. 193643b, Columbus, Ohio, US; & JP-A-58 197 296 (Honny Chemicals Co. Ltd) Nov. 16, 1983.
Chemical Abstracts, vol. 80, no. 24, Jun. 17, 1974, p. 98, abstract no. 135034m, Columbus, Ohio, US; & JP-A-73 93631 (Kansai Paint Co. Ltd) Dec. 4, 1973.

Primary Examiner—John C. Bleutge
Assistant Examiner—Mark Sweet
Attorney, Agent, or Firm—Wenderoth, Lind & Ponack

[57] ABSTRACT

Disclosed is a micro gel particle having an anionic charge for which it is electrodepositable by itself. The present invention provides a process for preparing an anionic micro gel particle dispersion comprising:
 emulsifying in an aqueous medium a resin composition comprising
  (A) 100 parts by weight of an anionic film-forming aqueous resin, and
  (B) 10 to 250 parts by weight of a thermosetting crosslinking agent which is self-crosslinked or crosslinked with said aqueous resin (A) in terms of condensation or addition reaction
 excepting the combination of an acrylic resin and an alcoxylated methylol melamine; parts by weight being based on the solid content of the resin composition, and
 heating the resultant emulsion to above a crosslinkable temperature of said crosslinking agent (B).

8 Claims, No Drawings

ANIONIC MICROGEL PARTICLE DISPERSION AND A COATING COMPOSITION THEREFROM

This application is a continuation of now abandoned application Ser. No. 07/171,916 filed on Jan. 5, 1988, now abandoned.

FIELD OF THE INVENTION

The present invention relates to a process for preparing an anionic micro gel particle dispersion and a coating composition obtained therefrom.

BACKGROUND OF THE INVENTION

It has been known to obtain a coated article having a matted surface by electrocoating with an electrodepositable paint containing internally crosslinked micro resin particles (hereinafter referred to as "micro gel particles") prepared by polymerizing an ethylenically unsaturated monomer (see Japanese Patent Publication (unexamined) Nos. 93762/1983 and 49766/1981). The micro gel particles are advantageous not only in providing a matted surface, but also in affecting the coating properties and throwing power.

The micro gel particles, however, should be mixed with a resin which is water-soluble or water-dispersible and which has electric charges necessary for electrodeposition if it is applied to electrocoating, because they do not have suitable electric charges and are insoluble in an aqueous medium. On the other hand, the micro gel particles deteriorate storage stability and workability of the electrocoating and it therefore is difficult to formulate into a paint in a large amount.

Japanese Patent Publication (unexamined) No. 31199/1986 discloses an electrocoating composition for providing a matted surface prepared by neutralizing a heat reaction product of an alpha, beta-ethylenically unsaturated polycarboxylic acid resin with an alkoxylated methylolmelamine. In this procedure, since the resin mixture is heated before uniformly emulsifying, it happens, when heating is carried out too long, the molecular weight comes too high and therefore it becomes difficult to dissolve the resin in water.

SUMMARY OF THE INVENTION

The present invention is to provide a micro gel particle having an anionic charge for which it is electrodepositable by itself. According to the present invention, the micro gel particle is obtained in the form of an aqueous dispersion. The present invention provides a process for preparing an anionic micro gel particle dispersion comprising:

emulsifying in an aqueous medium a resin composition comprising
(A) 100 parts by weight of an anionic film-forming aqueous resin, and
(B) 10 to 250 parts by weight of a thermosetting crosslinking agent which is self-crosslinked or crosslinked with said aqueous resin (A) in terms of a condensation or addition reaction except for the combination of an acrylic resin and an alkoxylated methylol melamine; wherein, the parts by weight are based on the solid content of the resin composition, and heating the resultant emulsion to above a crosslinkable temperature of said crosslinking agent (B).

The micro gel particle thus obtained has a crosslinked portion inside of the particle and is covered with the aqueous resin over said crosslinked portion, whereby it seems that the micro gel particle has a shellcore construction wherein the core is the crosslinked portion and the shell is the aqueous resin. The micro gel particle is electrodepositable due to an anionic charge.

The present invention additionally provides an aqueous coating composition containing the above micro gel particle.

DETAILED DESCRIPTION OF THE INVENTION

The anionic film-forming aqueous resin (A) is generally employed as a film-forming resin in the formulation of an anionic electrocoating composition. The resin (A) has an anionic functional group which is given a negative charge and hydrophilic nature to the resin. Examples of the anionic functional groups are a carboxyl group, a sulfonic acid group, a phosphate group and the like. Such resins are known to the art and all of them can be used in the present invention. Preferred anionic aqueous resins are a maleic natural or synthetic drying oil, a maleic polybutadiene resin, a half ester or half amide thereof, an anionic acrylic resin and the like.

The maleic oil can be prepared by reacting 30 to 300 mmol of maleic anhydride with 100 g of a natural or synthetic drying oil, or a natural or synthetic half-drying oil having an iodine value of not less than 100.

The maleic polybutadiene can be prepared by reacting 30 to 300 mmol of maleic anhydride with 100 g of a liquid polybutadiene having a molecular weight of 500 to 5,000.

The maleic oil and maleic polybutadiene may be used in the form of a dicarboxyl type, a half ester type or a half amide type, which is generally obtained by reacting it with water, an alcohol, a primary or secondary amine.

The anionic acrylic resin can be prepared by copolymerizing a (meth)acrylate with an ethylenically unsaturated monomer having an acid group and optionally another ethylenically unsaturated monomer. Examples of the (meth)acrylates are methyl (meth)acrylate, ethyl (meth)acrylate, butyl (meth)acrylate, hexyl (meth)acrylate, 2-ethylhexyl (meth)acrylate, lauryl (meth)acrylate, 2-hydroxyethyl (meth)acrylate, glycidyl (meth)acrylate and the like. Examples of the ethylenically unsaturated monomers having an acid group are (meth)acrylic acid, crotonic acid, itaconic acid, maleic anhydride, sulfoacrylate, mono(2-hydroxyethylacrylate)acid phosphate and the like. The other ethylenically unsaturated monomer which is an optional component includes styrene, vinyl toluene, acrylonitrile, acrylamide, vinyl acetate and the like. Representative examples of the anionic acrylic resin are commercially available from Toray Industries Inc. as Coatax WE-804, and Coatax WE-832.

The thermosetting crosslinking agent, which can be self-crosslinked or crosslinked with the aqueous resin (A) in terms of condensation or addition reaction, includes melamine resins, methylolphenols, etherified methylolphenols and the like.

The melamine resins may be a methylol type compound which is prepared by reacting melamine, benzoguanamine, acetoguanamine or a mixture thereof with formaldehyde. It may also be prepared by etherifying at least a portion of the methylol group of the methylol type compound with a lower alcohol having 1 to 4 carbon atoms.

The methylolphenols are those obtained by reacting phenols, such as phenol, p-cresol, p-t-butylphenol, amilphenol, p-phenylphenol and bisphenol A, with formaldehyde in the presence of an alkali catalyst. The etherified methylolphenols are generally prepared by partially or completely etherifying the phenolic OH group of the methylolphenols with a suitable etherifying agent. Examples of the etherifying agents are a monoepoxy compound, and a compound having the following formula:

R—X wherein R represents methyl, allyl, benzyl, oxirane and the like, and X represents a halogen atom. In case where the etherifying agent is the monoepoxy compound, the product reacted is beta-hydroxyphenol ether which is highly reactive and preferred.

The crosslinking agent (B) should be reactive at a temperature of less than about 100° C. at atmospheric pressure, because a crosslinking reaction is conducted in an aqueous medium. However, if the reaction is conducted under pressure in an autoclave, the crosslinking agent may be one which is reactive at more than 100° C.

It is noted that a combination of the acrylic resin and the alkoxylated methylol melamine should not be employed in the present invention, because the combination is insufficient in matted effects.

For lowering the viscosity of the resin composition of the aqueous resin (A) and the crosslinking agent (B) to emulsify with ease, the aqueous medium may further contain an organic solvent. Examples of the organic solvents are a water-miscible organic solvent, such as ethylene glycol monoethyl ether, ethylene glycol monopropyl ether, ethylene glycol monobutyl ether, methanol, ethanol, isopropyl alcohol, n-butanol, isobutanol, ethylene glycol dimethyl ether, diacetone alcohol, 4-methoxy-4-methylpentanone-2, acetone, methyl ethyl ketone, methoxy butanol, dioxane, ethylene glycol monoethyl ether acetate and the like; and a water-immiscible organic solvent, such as xylene, toluene, methyl isobutyl ketone, hexane, carbon tetrachloride, 2-ethylhexanol, isophorone, cyclohexane, benzene and the like.

For promoting the crosslinking reaction, the resin composition of the aqueous resin (A) and crosslinking agent (B) may further contain a catalyst. In case where the crosslinking agent is the melamine resin, preferred catalysts are dinonylnaphthalene sulfonic acid and dinonylnaphthalene disulfonic acid.

Where the resin composition containing the aqueous resin (A) and the crosslinking agent (B) is emulsified in an aqueous medium, at least 20 mol % of the acid group in the aqueous resin (A) is primarily neutralized with a base and it is emulsified together with the crosslinking agent (B) and the aqueous medium. An amount of the crosslinking agent (B) may be 10 to 250 parts by weight per 100 parts by weight of the aqueous resin (A), which is calculated in terms of the solid content. The base for neutralizing the aqueous resin (A) includes ammonia, diethanolamine, triethanolamine, methylethanolamine, N,N-dimethylethanolamine, N,N-diethylethanolamine, diethylamine, triethylamine, morphorine, potassium hydroxide and the like.

The aqueous medium is primarily water. It can contain a surfactant for facilitating emulsification. Examples of the surfactants are a nonionic surfactant, such as polyethylene glycol alkylphenyl ether, polyethylene glycol alkyl ether, polyoxyalkylene alkyl ether, polyethylene glycol sorbitane monostearate, polypropylene glycol polyethylene glycol ether and the like; and an anionic surfactant, such as a polyoxyethylene alkylphenyl ether sulfate ammonium salt, a polyoxyethylene alkyl ether sulfate ammonium salt and the like.

It is preferred that the solvent in the emulsion is azeotropically removed from the emulsion before or during heating thereafter. Removal of the solvent may facilitate crosslinking reaction.

The emulsion thus obtained is heated to above a crosslinkable temperature at atmospheric pressure or under pressure in accordance with the sort of the crosslinking agent (B) to obtain an aqueous dispersion of the anionic micro gel particle of the present invention.

The micro gel particle has an electric charge on the surface and stably dispersed in water due to its repulsion force. The obtained emulsion is stable to heat and therefore the crosslinking reaction of the crosslinking agent (B) can smoothly proceed. The termination of crosslinking reaction can be identified by adding a solvent capable of dissolving a resin, such as tetrahydrofuran. When crosslinking reaction dose not occur, the emulsion turns to a transparent state, and if crosslinking reaction occurs, the solution turns to turbid white. The obtained aqueous dispersion of the anionic micro gel particle can be used in neat or the micro gel particle which is taken out from the dispersion by vacuum drying can also be used.

In another embodiment of the present invention, a solid particle was added in the emulsion before heating to form a micro gel particle containing a solid particle as a core. By "micro gel particle dispersion" herein is meant a dispersion containing a micro gel particle containing a solid particle therein as a core. The solid particle for this embodiment is a particle which is not dissolved with the crosslinking agent and an organic solvent therein and includes a pigment and a crosslinked gel particle. Examples of the pigments are ion oxide, strontium chromate, zinc chromate, carbon black, titanium dioxide, talc, aluminum silicate, precipitated barium sulfate, basic lead sulfate, aluminum phosphomolybdate, a metallic pigment such as zinc powder, and an extender pigment.

The aqueous dispersion of the anionic micro gel particle itself can be used as an aqueous coating composition, especially an anionic electrocoating composition. The aqueous coating composition may further contain a water soluble or water dispersible anionic film-forming resin if desired. The coating composition may separately contain a pigment. Examples of the pigments are a color pigment, such as titanium dioxide, iron oxide red, carbon black and the like; an extender pigment, such as aluminum silicate, precipitated barium sulfate and the like; and a corrosion-preventive pigment, such as aluminum phosphomolybdate, strontium chromate, basic lead silicate, lead chromate and the like. The solid content of the electrocoating composition preferably adjusts to 10 to 20% by weight. The electrocoating composition is generally electrodeposited to form a film having a dried thickness of 15 to 30 micron and baked to cure.

EXAMPLES

The present invention is illustrated by the following examples, which are not to be construed as limiting the invention to their details. In the examples, part and % are based on weight unless otherwise indicated.

PRODUCTION EXAMPLE 1

Maleic Polybutadiene Resin

A maleic polybutadiene resin was prepared from the following ingredients.

| Ingredients | Weight(g) |
| --- | --- |
| Nisseki Polybutadiene B-1500[1] | 1000 |
| Antigen 6C[2] | 10 |
| Maleic anhydride | 250 |
| Deionized water | 20 |
| Diethylamine | 0.5 |
| Propylene glycol | 100 |
| Ethylene glycol monoethyl ether | 340 |

[1]Polybutadiene having Mn 1500, vinyl 65%, trans 14% and cis 16, available from Nippon Petrochemicals Co. Ltd.
[2]N-methyl-N'-(1,3-dimethylbutyl)-p-phenylenediamine available from Sumitomo Chemical Industries Inc.

Nisseki Polybutadiene B-1500 was charged in a 2 liter flask having a condenser to which Antigen 6C and maleic anhydride were added. The content was kept at 190° to 200° C. with stirring to conduct an addition reaction of maleic acid to polybutadiene. After about 5 hours from the beginning of the heating, it was identified by a color reaction of dimethylaniline to finish the addition reaction. The reaction mixture was cooled to 100° C., and a mixture of deionized water and diethylamine was added dropwise over about 30 minutes. After finishing the addition, mixing continued for about one hour to obtain an acid value of 140. Then, propylene glycol was added to the reaction mixture and the reaction was conducted at 110° C. for 3 hours to obtain an acid value of 125. Next, ethylene glycol monoethyl ether was added and mixed at 80° C. for about one hour to finish a synthesis. The obtained vanish had a nonvolatile content of 80%.

PRODUCTION EXAMPLE 2

Beta-Hydroxyphenol Ether Compound

Beta-hydroxyphenol ether compound was prepared from the following ingredients.

| Ingredients | Parts by weight |
| --- | --- |
| Tamanol 722[1] | 60 |
| Butyl glycidyl ether | 23 |
| n-Butanol | 10 |
| Methoxybutanol | 10 |
| Bimethylbenzylamine | 0.4 |

[1]A resol type phenol resin available from Arakawa Kagaku K.K.

Tamanol 722 was charged in a reaction vessel to which methoxybutanol and n-butanol were added and then butyl glycidyl ether was added. The content was mixed uniformly and a temperature rises to 100° C., at which temperature dimethylbenzylamine was added to the content. Mixing was continued at 100° C. for 3 hour while paying attention to the rapid elevation of temperature, after which an amount of glycidyl group of the reaction product was measured to find less than 5% of the charged amount. The content was cooled to conduct an analysis. The analysis showed that the phenolic OH group disappears and beta-hydroxyphenol ether compound having a methylol group and a secondary alcohol group was obtained.

PRODUCTION EXAMPLE 3

Pigment Paste 125 g of the maleic polybutadiene resin of Production Example 1 was mixed with 13 g of triethylamine and 250 g of deionized water was slowly added to uniformly dissolve it to obtain a varnish having a nonvolatile content of about 26%. To the varnish was added 150 g of titanium dioxide, 50 g of lead silicate, 25 g of strontium chromate and 25 g of carbon black and mixed by a disper for about one hour. Glass beads were added to the obtained mixture and ground to a particle size of 20 micron by a sand mill, after which the glass beads were filtered and 1112 g of deionized water was added to obtain a pigment paste having a nonvolatile of 20%.

EXAMPLE 1

Resin Emulsion A

An anionic micro gel particle dispersion was prepared from the following ingredients.

| Ingredients | Parts by weight | Solid content % |
| --- | --- | --- |
| Maleic polybutadiene resin | 62.5 | 50 |
| U-ban 22R[3] | 100 | 50 |
| Cobalt naphthenate | 1.67 | 1.67 |
| Triethylamine | 6.1 | |
| Deionized water | 338 | |

[3]n-Butylated melamine resin available from Mitsuitoatsu Chemical Industries Inc.

Maleic polybutadiene resin of Production Example 1 was mixed with U-ban 22R, cobalt naphthenate and triethylamine to form a mixture. Deionized water was added to the resultant mixture and emulsified to form an resin emulsion. While deionized water was further added, the solvent was removed under reduced pressure to form a resin emulsion A. A small portion of the resin emulsion A was added to 100 times the amount of tetrahydrofuran to dissolve the resin so that it is in a transparent form.

The resin emulsion was allowed to stand at 95° C. for 3 hours and then cooled to form an anionic micro gel particle dispersion. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Anionic electrocoating was conducted using a degreased polished steel plate to be coated as an anode in the anionic micro gel particle solution thus obtained. The coated article was baked at 140° C. for 20 minutes to obtain a clear coating having a thickness of 20 micron. Gloss was evaluated by inserting light at an angle of 60°. The result was shown in Table 1.

EXAMPLE 2

Resin Emulsion B

An anionic micro gel particle dispersion was prepared from the following ingredients.

| Ingredients | Parts by weight | Solid content % |
| --- | --- | --- |
| Maleic polybutadiene resin | 62.5 | 50 |
| Beta-hydroxyphenol ether | 73.5 | 50 |

| Ingredients | Parts by weight | Solid content % |
|---|---|---|
| compound | | |
| Cobalt naphthenate | 1.67 | 1.67 |
| Triethylamine | 6.1 | |
| Deionized water | 365 | |

The maleic polybutadiene resin of Production Example 1 was mixed with beta-hydroxyphenol ether, cobalt naphthenate and triethylamine to form a mixture. Deionized water was added to the resultant mixture and emulsified to form an resin emulsion. While deionized water was further added, the solvent was removed under reduced pressure to form a resin emulsion B. A small portion of the resin emulsion B was added to 100 times the amount of tetrahydrofuran to transparently dissolve it.

The resin emulsion was allowed to stand at 55° C. for 7 days and then cool to form an anionic micro gel particle dispersion. The dispersion does not dissolve in tetrahydrofuran but makes a turbid white solution. The dispersion was observed by a microscope to see a micro particle having a particle size of not more than 100 nm.

Anionic electrocoating was conducted using a degreased polished steel plate to be coated as an anode in the anionic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 3

Four hundred gram of the resin emulsion A was mixed with 100 g of the pigment paste of Production Example 3 at 95° C. for 3 hours and then cooled.

Anionic electrocoating was conducted using a degreased polished steel plate to be coated as an anode in the above composition. The coated article was baked at 140° C. for 20 minutes to obtain a coating having a thickness of 20 micron. Gloss was evaluated by inserting light at an angle of 60°. The result was shown in Table 1.

EXAMPLE 4

Resin Emulsion C

An anionic micro gel particle dispersion was prepared from the following ingredients.

| Ingredients | Parts by weight | Solid content % |
|---|---|---|
| Coatax WE-804[4] | 91 | 50 |
| U-ban 22R | 100 | 50 |
| Triethylamine | 1.4 | |
| Deionized water | 357.1 | |

[4] A water-soluble anionic acrylic resin available from Toray Industries Inc.

Cortax WE-804 was mixed with U-ban 22R and triethylamine and emulsified with deionized water. While deionized water was further added, the solvent was removed under a reduced pressure to form a resin emulsion C. A small portion of the resin emulsion C was added to 100 times amount of tetrahydrofuran to transparently dissolve it.

The resin emulsion was kept warm at 55° C. for 7 days and then cooled to form an anionic micro gel particle dispersion. The dispersion does not dissolve in tetrahydrofuran but makes a turbid white solution. The dispersion was observed by a microscope to see a micro particle having a particle size of not more than 100 nm.

Anionic electrocoating was conducted using a degreased polished steel plate to be coated as an anode in the anionic micro gel particle solution thus obtained. The coated article was baked at 140° C. for 20 minutes to obtain a clear coating having a thickness of 20 micron. Gloss was evaluated by inserting light at an angle of 60°. The result was shown in Table 1.

EXAMPLE 5

Resin Emulsion D

An anionic micro gel particle dispersion was prepared from the following ingredients.

| Ingredients | Parts by weight | Solid content % |
|---|---|---|
| Coatax WE-804 | 91 | 50 |
| Beta-hydroxyphenol ether compound | 73.5 | 50 |
| Triethylamine | 1.4 | |
| Deionized water | 334 | |

Cortax WE-804 was mixed with beta-hydroxyphenol ether compound of Production Example 2 and triethylamine and emulsified with deionized water. While deionized water was further added, the solvent was removed under a reduced pressure to form a resin emulsion D. A small portion of the resin emulsion D was added to 100 times the amount of tetrahydrofuran to dissolve the resin into a clear emulsion.

The resin emulsion was kept warm at 55° C. for 7 days and then cooled to form an anionic micro gel particle dispersion. The dispersion does not dissolve in tetrahydrofuran but makes a turbid white solution. The dispersion was observed by a microscope to see a micro particle having a particle size of not more than 100 nm.

Anionic electrocoating was conducted using a degreased polished steel plate to be coated as an anode in the anionic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

COMPARATIVE EXAMPLES 1 AND 2

Production and test were conducted as generally described in Example 1 with the exception that the resin emulsions A and B were not heated. By a dipping test using a tin plate, no micro particles are observed by a microscope. The result of the gloss test on an electrocoated plate is shown in Table 1.

COMPARATIVE EXAMPLE 3

One hundred grams of pigment paste of Production Example 3 was added to 400 g of the resin emulsion A which was not heated to form an anionic electrocoating composition. In the electrocoating composition, an article serving as an anode was electrocoated and then baked at 140° C. for 20 minutes to obtain a cured coating having a thickness of 20 microns. The same test as Example 1 was conducted and the result is shown in Table 1.

COMPARATIVE EXAMPLES 4 and 5

Production and test were conducted as generally described in Example 1 with the exception that the resins emulsion C and D were not heated. By a dipping test using a tin plate, no micro particles are observed by a microscope. The result of the gloss test on an electrocoated plate is shown in Table 1.

TABLE 1

| Examples | 60° Gloss |
| --- | --- |
| 1 | 15 |
| 2 | 13 |
| 3 | 12 |
| 4 | 23 |
| 5 | 27 |
| Comparative Example | |
| 1 | 40 |
| 2 | 38 |
| 3 | 38 |
| 4 | 72 |
| 5 | 63 |

EXAMPLE 6

An anionic micro gel particle dispersion was prepared from the following ingredients.

| Ingredients | Parts by weight | Solid content % |
| --- | --- | --- |
| Strontium chromate | 25 | 25 |
| U-ban 22R | 50 | 25 |
| Maleic polybutadiene resin | 62.5 | 50 |
| Cobalt naphthenate | 1.67 | 1.67 |
| Triethylamine | 6.1 | |
| Deionized water | 363 | |

Strontium chromate was mixed with a U-ban 22R compound and glass beads, and ground by a sand mill. Maleic polybutadiene resin, cobalt naphthenate and triethylamine were added and then emulsified by adding deionized water. Deionized water was further added to the emulsion, while the solvent was removed under reduced pressure. The resultant resin emulsion E was allowed to stand at 55° C. for 7 days and then cooled to form an anionic micro gel particle dispersion.

The dispersion was rinsed with a large amount of tetrahydrofuran. A tin plate was dipped in the dispersion and dried by air and then under a reduced pressure. The obtained tin plate was observed by a microscope to see a micro particle covering a strontium chromate particle with a crosslinked resin layer.

The emulsion which was not heated was added to a large amount of tetrahydrofuran and strontium chromate having no cover layer was observed by a microscope.

EXAMPLE 7

An anionic micro gel particle dispersion was prepared from the following ingredients.

| Ingredients | Parts by weight | Solid content % |
| --- | --- | --- |
| Zinc powder | 25 | 25 |
| U-ban 22R | 50 | 25 |
| Maleic polybutadiene resin | 62.5 | 50 |
| Cobalt naphthenate | 1.67 | 1.67 |
| Triethylamine | 6.1 | |
| Deionized water | 363 | |

Strontium chromate was mixed with a U-ban 22R compound and glass beads, and ground by a sand mill. Maleic polybutadiene resin, cobalt naphthenate and triethylamine were added and then emulsified by adding deionized water. Deionized water was further added to the emulsion, while the solvent was removed under reduced pressure. The resultant resin emulsion E was allowed to stand at 55° C. for 7 days and then cooled to form an anionic micro gel particle dispersion.

The dispersion was rinsed with a large amount of tetrahydrofuran and added in 1N hydrochloric acid. Hydrogen gas is not produced. The dispersion was added to a large amount of tetrahydrofuran to rinse. A tin plate was dipped in the dispersion and dried by air and then under a reduced pressure. The obtained tin plate was observed by a microscope to see a micro particle covering a zinc powder with a crosslinked resin layer.

The emulsion which was not heated was rinsed with a large amount of tetrahydrofuran and added in 1N hydrochloric acid. No hydrogen gas was produced. According to the observation by a microscope, zinc powder which had no resin layer was observed.

EXAMPLE 8

An anionic micro gel particle dispersion was prepared from the following ingredients.

| Ingredients | Parts by weight | Solid content % |
| --- | --- | --- |
| Strontium chromate | 25 | 25 |
| Beta-hydroxyphenol ether compound | 36.75 | 25 |
| Maleic polybutadiene resin | 62.5 | 50 |
| Cobalt naphthenate | 1.67 | 1.67 |
| Triethylamine | 6.1 | |
| Deionized water | 376 | |

The procedure was conducted as generally described in Example 6 with the exception that 50 parts by weight of U-ban 22R was changed to 36.75 parts by weight of beta-hydroxyphenyl ether compound of Production Example 2 and an amount of deionized water was changed to 376 parts by weight. The obtained dispersion paste had the same properties as Example 6.

What is claimed is:

1. A process for preparing an anionic micro gel particle dispersion comprising:
   (i) emulsifying in an aqueous medium a resin composition comprising
      (A) 100 parts by weight of an anionic film-forming aqueous resin, and
      (B) 10 to 250 parts by weight of a thermosetting crosslinking agent which is self-crosslinked or crosslinked with said aqueous resin (A) in terms of a condensation or addition reaction wherein the parts by weight are based on the solid content of the resin composition,
   provided that, when the aqueous resin (A) is selected from the group consisting of maleic natural or synthetic drying oil and maleic polybutadiene and a half-ester or half-amide thereof, the thermosetting crosslinking agent (B) is selected from the group consisting of methylolphenols, etherified methylolphenols and melamine resins, and when the aqueous resin (A) is an anionic acrylic resin, the thermosetting crosslinking agent (B) is selected from the group consisting of methylolphenols and etherified methylolphenols, (ii) and then heating the resultant emulsion to a temperature above the crosslinkable temperature of said crosslinking agent (B).

2. The process according to claim 1 wherein the methylol phenols is a beta-hydroxyphenol ether.

3. The process according to claim 1 wherein the crosslinking agent (B) is tetrabromobisphenol A.

4. The process according to claim 1 wherein the emulsion additionally comprises an organic solvent which is removed before or during the heating step.

5. The process according to claim 1 wherein the emulsion further comprises a solid particle.

6. The process according to claim 5 wherein the solid particle is selected from the group consisting of a pigment and a metal particle.

7. The process according to claim 4, wherein the emulsion further comprises a solid particle.

8. A micro gel particle obtained by the process of claim 5.

* * * * *

UNITED STATES PATENT AND TRADEMARK OFFICE
CERTIFICATE OF CORRECTION

PATENT NO. : 5,200,461
DATED : April 6, 1993
INVENTOR(S) : Yasuyuki TSUCHIYA et al.

It is certified that error appears in the above-indentified patent and that said Letters Patent is hereby corrected as shown below:

On the title page: Item [45]Date: before "April 6, 1993", insert --*-- so as to read as follows:

* April 6, 1993

On the title page:Item: [73] Assignee: Nippon Paint Co., Ltd, Osaka, Japan," please insert the following separate paragraph --[*] NOTICE: The portion of the term of this patent, subsequent to November 6, 2007 has been disclaimed.--

Signed and Sealed this

Nineteenth Day of December, 1995

*Attest:*

BRUCE LEHMAN

*Attesting Officer*  *Commissioner of Patents and Trademarks*